United States Patent [19]
Briest et al.

[11] Patent Number: 6,023,152
[45] Date of Patent: Feb. 8, 2000

[54] SYSTEM FOR STABILIZING A POWER SUPPLY SYSTEM

[75] Inventors: Ralf Briest; Hilmar Darrelmann; Klaus Sachs; Uwe Schrader-Hausmann, all of Osterode, Germany

[73] Assignee: Piller-GmbH, Osterode am Harz, Germany

[21] Appl. No.: 09/059,470

[22] Filed: Apr. 13, 1998

[30] Foreign Application Priority Data

Apr. 14, 1997 [DE] Germany .................. 197 15 468

[51] Int. Cl.⁷ .................. G05F 1/70; H02J 9/08
[52] U.S. Cl. .................. 323/207; 323/201; 307/67
[58] Field of Search .................. 323/207, 201, 323/348; 363/56, 98, 132; 307/57, 66

[56] References Cited

U.S. PATENT DOCUMENTS

| | | | |
|---|---|---|---|
| 4,001,666 | 1/1977 | Grenfell | 322/4 |
| 4,517,471 | 5/1985 | Sachs | 323/201 |
| 4,694,235 | 9/1987 | Flowers . | |
| 4,700,094 | 10/1987 | Downer et al. . | |

FOREIGN PATENT DOCUMENTS

| | | |
|---|---|---|
| 176919 | 12/1953 | Austria . |
| 0 069 567 | 1/1983 | European Pat. Off. . |
| 0 071 852 | 2/1983 | European Pat. Off. . |
| 2 041 924 | 4/1971 | Germany . |
| 196 08 099 | 2/1997 | Germany . |
| 2 007 036 | 5/1979 | United Kingdom . |
| WO 96/05646 | 2/1996 | WIPO . |
| WO 96/24981 | 8/1996 | WIPO . |
| WO 97/18621 | 5/1997 | WIPO . |

OTHER PUBLICATIONS

Sachs, K. et al., "Univers im Uniblock," *EET*, pp. 16–25, Jun., 1989.

Sachs, K., "Neue USV–Generation," etz, Bd. 112, Heft 20, pp. 1102–1107, 1991.

Offringa, Lodewijk Jacob Jan, "Electronic Power Converter for A Flywheel Unit with a Synchronous Electrical Permanent Magnet Machine", Thesis, Dec. 2, 1991.

Bouwknegt, K. "The Line–interactive Concept, an Optimal Aproach to UPS", Telescon '94, The First International Telecommunications Energy Special Conference, Apr. 11–15, 1994, Berlin, Germany, pp. 357–359.

Takahashi, I. et al. "Development of a Simple Flywheel UPS Having Active Filter Ability", *EPE Firenze*, 1991, pp. 1–282 to 1–287.

*Primary Examiner*—Peter S. Wong
*Assistant Examiner*—Rajnikant B. Patel
*Attorney, Agent, or Firm*—Barry R. Lipsitz

[57] ABSTRACT

In order to provide a system for stabilizing a power supply system comprising a choke, which connects the power supply system to a mains power feed, a converter system connected to the power supply system and having a converter machine with a rotor and at least one three-phase winding, which is in a position to stabilize the voltage in the power supply system to a specific value it is suggested that the converter system comprise a flywheel storage means with a synchronous machine and a flywheel coupled thereto, that the converter system have a static converter system, with which the flywheel storage means can be coupled to the converter machine such that the flywheel storage means can draw power from the converter machine or supply power to it, and that a control be provided which detects the voltage of the power supply system and controls the static converter system such that the converter machine stabilizes the voltage of the power supply system to a predeterminable value by drawing or supplying power.

25 Claims, 7 Drawing Sheets

SYSTEM FOR STABILIZING A POWER SUPPLY SYSTEM

The present disclosure relates to the subject matter disclosed in German Application No. 197 15 468.9 of Apr. 14, 1997, the entire specification of which is incorporated herein by reference.

The invention relates to a system for stabilizing a power supply system comprising a choke which connects the power supply system to a mains power feed, a converter system connected to the power supply system and having a converter machine with a rotor and at least one three-phase winding.

A system of this type is known, for example, from EP 0 071 852 in conjunction with FIG. 6. This system does, however, represent merely an incomplete stabilization of the power supply system since this is in a position to intercept drops in voltage in the power supply system only to a restricted extent.

The object underlying the invention is therefore to provide a system for stabilizing a power supply system which is in a position to stabilize the voltage in the power supply system to a specific value.

This object is accomplished in accordance with the invention, in a system of the type described at the outset, in that the converter system comprises a flywheel storage means with a synchronous machine and a flywheel coupled thereto, that the converter system has a static converter system, with which the flywheel storage means can be coupled to the converter machine such that the flywheel storage means can draw power from the converter machine or supply power to it, and that a control is provided which detects the voltage of the power supply system and controls the static converter system such that the converter machine stabilizes the voltage of the power supply system to a predeterminable value by drawing or supplying power.

The inventive system has the advantage that this is in a position to draw power from the power supply system as well as supply power to it and thus to compensate for any types of power variation in the power supply system and to stabilize the voltage completely with respect to effective value and phase relationship.

A good stabilization of the power supply system must be in a position to draw power and supply power at short intervals. This is advantageously achieved by a flywheel storage means which is predestined for this purpose on account of its high resistance to changing loads with a long service life, wherein this combination with the static converter system offers the additional advantage that rapid changes between power take-up and power supply are possible.

The static converter system can, in principle, be of any optional design as long as it makes a change between power take-up and power supply of the flywheel storage means possible quickly and reliably. A particularly favorable solution provides for the static converter system to comprise at least one static converter circuit with two static converters coupled via a direct current link. Such a static converter system is easy to operate and, in addition, allows the possibility of, with excellent adjustability, regulating the power drawn off or supplied by the flywheel storage means with the required precision which is necessary for a good stabilization.

In order, in the simplest case, to be able to operate with one static converter circuit, it is preferably provided for each of the static converters to be switchable between a rectifier function and an inverter function. This means that not only the power take-up but also the power supply of the flywheel storage means can be controlled in a simple manner.

In order to avoid functional errors of the static converter circuit, it is preferably provided for the static converters to be controlled by the control only such that in one static converter circuit one of the static converters operates in a rectifier function and the other in an inverter function. This means that a constant functional readiness of the static converter circuit is ensured, either for the power take-up or for the power supply.

On account of the fact that the static converter of a static converter circuit can be switched over, it is, in principle, adequate for the static converter system to operate with one static converter.

One advantageous embodiment does, however, provide for the static converter system to comprise several static converter circuits connected in parallel. With this solution it would, in principle, not be necessary to design the static converter circuits such that the static converters can each be switched over. It would, for example, be possible to configure one static converter circuit such that it can only be used for the power supply of the flywheel storage means and to design the other static converter circuit such that it can only be used for the power take-up of the flywheel storage means.

It is, however, particularly advantageous when each of the static converter circuits of the static converter system is also provided with switchable static converters since, as a result, the possibility is created, for example, of building up a redundant system which still functions, for example, even during failure of one static converter circuit.

Another, advantageous solution provides for the static converters of one static converter circuit to be usable by the control preferably for supplying power to the converter machine or for taking power from the converter machine. This preferred usability does not, however, preclude a switchability of the static converters of the static converter circuits. Their switchability can thus be used advantageously for maintaining redundancy of the system.

It is, however, also advantageously conceivable in the case of several static converter circuits to design these such that they are merely in a position to couple half the maximum effective power so that for such a time as only half the maximum effective power has to be coupled from the flywheel storage means to the converter machine or vice versa the static converter circuits can be used in their preferred mode of operation whereas when power which is greater than half the maximum effective power has to be coupled from the converter machine to the flywheel storage means or vice versa the static converters of the one static converter circuit are switched over so that, in this case, both static converter circuits are then operating in parallel. Such a system has, in addition, the advantage that it can also operate redundantly up to half the maximum effective power, i.e. when one static converter circuit fails, a stabilization of the power supply system is possible at least in those cases, in which half the maximum effective power is required at the most.

Furthermore, it is preferably provided for a choke to be arranged in the direct current link of each static converter circuit. Such a choke has the advantage that with it changes in power as a result of differences in the instantaneous voltage values, which are caused by the connecting or switching over of the two static converters, can be minimized.

In conjunction with the preceding explanations concerning the inventive system it has merely been assumed that a choke is provided between the mains power feed and the power supply system. A particularly advantageous solution provides for the choke between the mains power feed and the power supply system to be designed as a coupling choke and for the converter machine to be connected to an intermediate tap of the coupling choke. Such a coupling choke has the advantage that it partially compensates, itself, for the effects of changes in voltage in the mains power feed for the power supply system and thus sustains the effect of the converter machine in stabilizing the voltage in the power supply system.

A particularly expedient solution provides for the counterreactance of the coupling choke to correspond approximately to the subtransient reactance of the converter machine. In this case, an optimum adjustment between converter machine and coupling choke is achieved and so the coupling choke sustains the effect of the converter machine in stabilizing the power supply system in an optimum manner.

No details have so far been given with respect to the control used in the inventive system. One advantageous embodiment, for example, provides for the control to detect and compare the voltage in the mains power feed and the voltage in the power supply system. The control is thus in a position to also detect the difference in voltage and phase between the power supply system and the mains power feed and to control the power coupling effected by the static converter system between the flywheel storage means and the converter machine exactly, wherein this takes place, in particular, as a result of a firing angle being specified for the static converters.

A particularly favorable construction of the control provides for this to use the current in the direct current link of the respective static converter circuit for additional control.

With respect to the controllability of the inventive converter machine, no details have been given in conjunction with the preceding explanations concerning the inventive solution. One advantageous embodiment, for example, provides for the voltage generated by the converter machine to be controllable via an exciter winding of the rotor, wherein the amount of voltage can be controlled via this exciter winding of the rotor, but not its phase angle. The phase angle is controlled in the manner already described via the exact control of the static converter system, in particular, the control of the firing angle therein. In order to be able to trigger the excitation of the converter machine in a particularly favorable manner, it is provided for the exciter winding to be excitable in a brushless manner.

In order to control the voltage generated by the converter machine, it is preferably provided for the excitation of the converter machine to be controlled in accordance with the voltage in the power supply system.

This control of the excitation of the converter machine is preferably independent of the control for the static converter system so that an independent control of the converter machine, in particular even in the form of a closed-loop control, is possible independently of the operation of the static converter system.

With respect to the construction of the converter machine itself, no details have been given in conjunction with the preceding explanations concerning the individual embodiments. One advantageous embodiment, for example, provides for the converter machine to have a single three-phase winding which is connected to the power supply system and to the static converter system. This is the simplest possibility of constructing such a converter machine which does, however, have disadvantages with respect to the quality of the voltage present in the power supply system, particularly since this is liable to peaks and troughs on account of the switching of the static converter system.

For this reason, an additional, advantageous solution provides for the converter machine to have a first and a second three-phase winding so that the power supply system can be coupled to one three-phase winding and the flywheel storage means to the other three-phase winding.

In this respect, it is particularly favorable when the first three-phase winding and the second three-phase winding have the same number of poles.

In principle, a converter machine of this type can be constructed with two three-phase windings in the form of two machines coupled mechanically with one another via a shaft. This solution does have disadvantages with respect to the constructional size of the machine. It does, however, also have advantages since the three-phase winding coupled to the power supply system can, for example, be designed as a winding for high voltage whereas the other three-phase winding can be designed for medium to low voltage.

A particular advantage of two three-phase windings is to be seen, in particular, in the fact that, irrespective of the question of the voltage present, a galvanic decoupling of the power supply system and the static converter system with the flywheel storage means is possible as a result.

With respect to the constructional size and the mode of operation, it is particularly favorable when the first three-phase winding and the second three-phase winding are arranged in a common stator pack. Such a solution has the great advantage that, on the one hand, the machine can be of a small construction in relation to the required power and, in addition, still have a small intrinsic resistance.

With such a solution there is preferably no conversion of the power supplied in the one three-phase winding into mechanical energy and then a reconversion of mechanical energy into electrical energy again in the other three-phase winding; rather there is a direct transformative transfer of the electrical energy by way of flux linkage between the two three-phase windings.

A particularly favorable solution provides for the first three-phase winding and the second three-phase winding to be arranged in separate slots.

A further, advantageous solution of the inventive converter machine provides for the rotor to have an attenuator winding. Such an attenuator winding has the advantage that it effectively short-circuits the harmonic waves of the voltage present and thus eliminates them in the flux so that only the basic frequency is transferred from the one three-phase winding to the other three-phase winding.

With respect to the design of the flywheel storage means itself, no details have been given in conjunction with the preceding description of the individual solutions. One advantageous embodiment, for example, provides for the flywheel storage means to have a flywheel rotating about a vertical axis. Such an arrangement of the flywheel has advantages with respect to its mounting since the possibility exists of supporting the flywheel in axial direction merely by way of a bearing. One advantageous possibility, for example, provides for the flywheel to be held in a bearing in the direction of its axis of rotation, wherein this bearing can, for example, be a bearing provided in the region of the lower end of a shaft supporting the flywheel.

Alternatively thereto, it is advantageously provided for the flywheel to be arranged in a suspended manner, i.e. for the bearing supporting the flywheel in the direction of its axis of rotation to be located vertically above the flywheel; this mounting of the flywheel may be stabilized in a simple manner even at high rotational speeds of the flywheel.

The bearing stabilizing the flywheel in axial direction can be designed, in principle, as a sliding bearing.

Alternatively thereto, one advantageous embodiment does, however, provide for this bearing to be designed as a magnetic bearing which has the advantage that the bearing friction forces which occur are less.

A particularly favorable solution, in particular, with respect to the selection safety, as well, provides for the magnetic bearing to be designed as a passive magnetic bearing.

With respect to the arrangement of a rotor of the synchronous machine relative to the flywheel, no further details have so far been given. One advantageous embodiment, for example, provides for a rotor of the synchronous machine to be seated directly on a shaft of the flywheel so that no gear elements are required and necessary between these two and thus a particularly simple and functionally stable unit results.

In this respect, it is particularly favorable when the flywheel is arranged on a side of the rotor located opposite the magnetic bearing so that not only the rotor but also the flywheel are arranged in a suspended manner relative to the magnetic bearing and thus a simple stabilization is also obtained with respect to the tilting torque.

Furthermore, the synchronous machine is preferably provided with an exciting machine which is associated with it and likewise offers the possibility of controlling the excitation of the synchronous machine and thus of also controlling the power drawn from it or supplied to it exactly.

In conjunction with the preceding explanations concerning the individual embodiments of the inventive system attention has been focused on the primary use of this system, namely the stabilization of a voltage in a power supply system.

The inventive system can, however, also be designed such that the converter system supplies the entire power consumed in the power supply system during any failure of the mains power feed to supply power, i.e. that, in this case, the converter system is available at the same time as an uninterruptible supply of power for the power supply system in a certain period of time. In this case, it is necessary for the flywheel storage means to be dimensioned in accordance with the load admissible in the power supply system.

This means that the inventive system provides not only a constant stabilization of the voltage in the power supply system with a functioning mains power feed but is also, itself, in a position to bridge any failure of the mains power feed for a certain length of time.

If bridging of any failure in the mains power feed is intended to be provided for any long duration, the inventive system can also be extended in such a manner that the converter machine of the converter system can be coupled to a motor drive means, for example, a diesel motor, which then operates the converter machine as a generator, which supplies the voltage for the power supply system, by driving the rotor of the converter machine. In this respect, however, the converter system still serves to stabilize the voltage in the power supply system, wherein the static converter system and the flywheel storage means, in particular, are in a position to compensate for any load change in the power supply system, on the one hand, or, on the other hand, to also compensate for any power variations of the motor driving the static converter machine.

Additional features and advantages of the invention are the subject matter of the following description as well as the drawings illustrating several embodiments.

Figure 1:
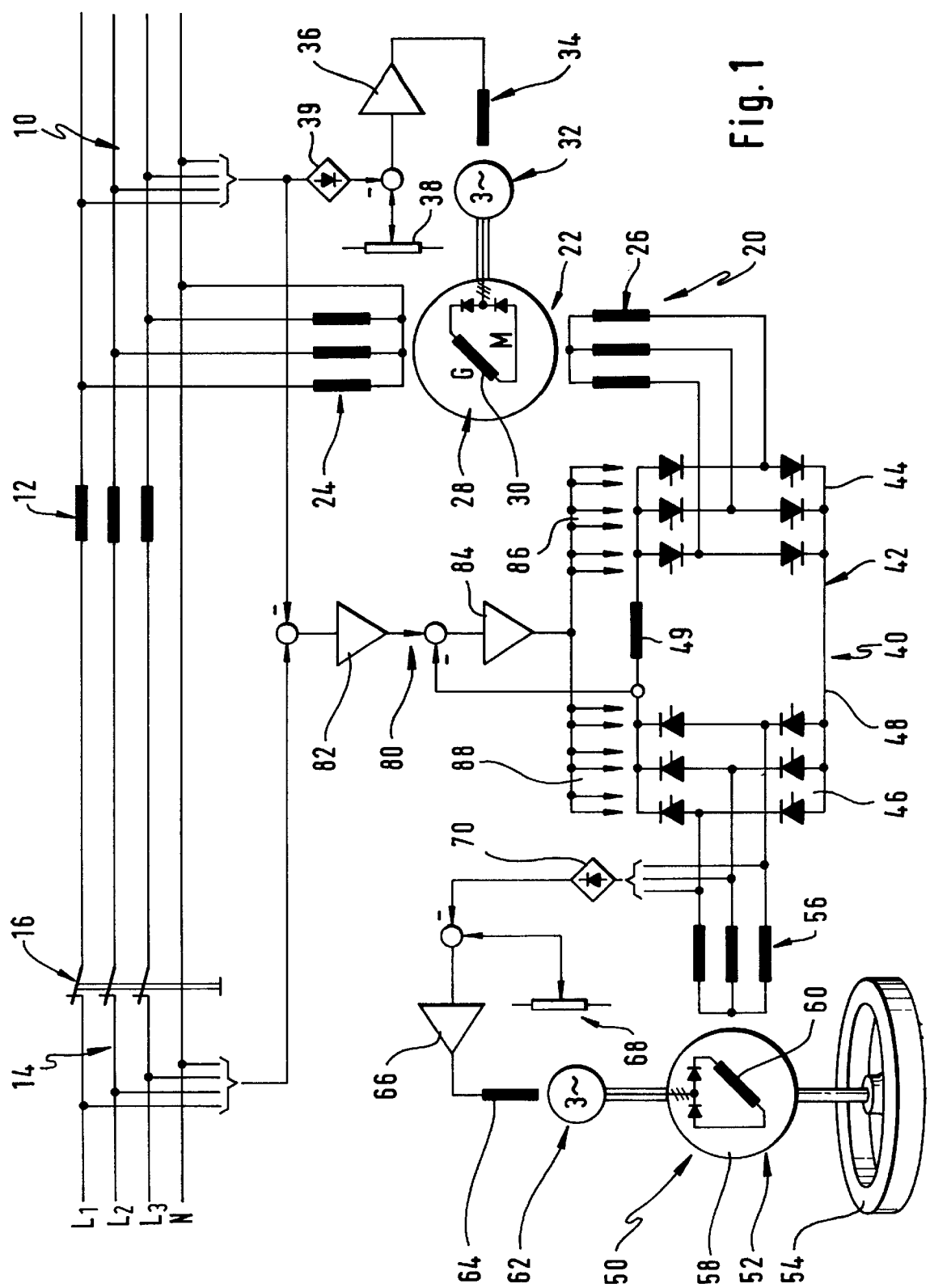
FIG. 1 shows a schematic illustration of a first embodiment of an inventive system.

A first embodiment of an inventive system for stabilizing a power supply system 10, which is connected via a choke 12 to a mains power feed 14, comprises a converter system which is designated as a whole as 20 and has a converter machine 22.

The converter machine 22 has, for its part, a first three-phase winding 24 and a second three-phase winding 26 as well as a rotor 28 which is provided with an exciter winding 30. The exciter winding 30 is preferably constructed as a direct current winding which can be excited via an exciting machine 32 with a stationary direct current winding 34.

The direct current winding 34 supplying a field current for the excitation of the converter machine 32 is controlled by a voltage regulator 36 which, on the one hand, detects a set voltage value predetermined by a set value generator 38 and, on the other hand, detects the voltage of the power supply system 10 via a voltage detector 39.

The second three-phase winding 26 is connected to a static converter system which is designated as a whole as 40 and comprises, for example, a static converter circuit 42 which is provided with a static converter 44 connected to the second three-phase winding 26 and a static converter 46, wherein the two static converters 44, 46 are coupled via a direct current link 48. A choke 49 is also provided in the direct current link 48.

The choke 49 in the direct current circuit 40 serves the purpose of compensating for power changes and thus differences in the instantaneous voltage values, caused by the switching of the two static converters.

The static converter 46 is, for its part, provided with a flywheel storage means which is designated as a whole as 50 and has a synchronous machine 52 and a flywheel 54 coupled thereto.

The synchronous machine 52 comprises a stationary three-phase winding 56 as well as a rotor 58 with an exciter winding 60 which can be acted upon with direct current via an exciting machine 62 in a brushless manner. The exciting machine 62 thereby comprises a stationary direct current winding 64 for controlling the exciting current in the exciter winding 60.

For acting on the direct current winding 64, an exciting regulator 66 is provided which, on the one hand, compares a set voltage value predeterminable by a set value generator 68 with the voltage at the three-phase winding 56 which can be detected via a voltage detector 70.

The static converter system 40 can, for its part, be controlled with a control which is designated as a whole as 80 and has a frequency regulator 82 which detects and compares the voltage of the power supply system 10 and the voltage of the mains power feed 14 and, in addition, a power regulator 84 which is post-connected thereto, detects current in the direct current link 48 in addition to the output signal of the frequency regulator 82 and, for its part, controls trigger controls 86 and 88 for the static converters 44 and 46. It may be determined via the respective trigger devices 86 and 88 that one of the static converters 44 or 46 operates as a rectifier and the other static converter 46 or 44 as an inverter and, in addition, a firing angle can be specified to the two static converters via the trigger devices 86 and 88.

The inventive system functions such that the power supply system fed from the mains power feed 14 via the chokes 12 is stabilized by the converter system 20 either drawing power from the power supply system 10 or supplying power to it, depending on the direction, in which a change in the voltage of the power supply system 10 to be stabilized results. If, for example, the voltage supplied from the mains power feed 14 is lower, the converter system 20 supplies power to the power supply system 10 in order to keep the voltage in the power supply system 10 constant. At the same time, power is also supplied when, for example, a load is switched into the power supply system 10 or, for example, an energy generator in the power supply system 10 is switched off.

Furthermore, power is drawn from the power supply system 10 in the inventive system when, for example, a load release or a switching in of an energy generator takes place in it which would lead to the voltage in the power supply system 10 increasing to above the desired voltage.

Power is drawn off and supplied via the converter system 20, on the one hand, by way of control of the voltage generated by the converter machine 22 in that the voltage regulator 36 detects the voltage in the power supply system 10 and compares it to the set value specified in the set value generator 38. The excitation in the exciter winding 30 in the rotor 28 is controlled accordingly.

In addition, the frequency regulator 82 detects the voltage in the power supply system 10 and the voltage in the mains power feed 14 as well as the current in the direct current link 48 and controls the trigger devices 86 and 88 of the static converters 44 and 46 accordingly such that the static converter circuit 42 draws effective power from the power supply system 10 via the converter machine 22 on account of the static converter 44 connected to the second three-phase winding 26 and stores this in the flywheel 54 via the synchronous machine 52, i.e. accelerates the flywheel 54 to a higher rotational speed or such that the static converter circuit 42 draws effective power from the flywheel storage means 50 by braking the flywheel 54 by means of the synchronous machine 52 and supplies this to the power supply system 10 via the converter machine 22.

On account of the fact that the flywheel storage means 50 has a high resistance to load changes it is possible to draw effective power from the power supply system 10 or supply effective power to it within very short cycles.

With every type of stabilization of the power supply system 10, the converter machine 22 not only supplies effective power to or draws effective power from the power supply system 10 but, in addition, supplies reactive power to or draws reactive power from it and so it is possible to compensate for large voltage variations, preferably voltage variations of up to 50%, with a relatively low withdrawal or supply of effective power since the converter machine 22 is in a position to supply very high reactive power to the power supply system 10 in addition or draw this from it and then add this to the voltage still being supplied from the mains power feed 14 such that the voltage in the power supply system 10 is kept essentially constant.

In addition, a switch 16 is provided between the mains power feed 14 and the choke 12 and this switch is opened during any breakdown in the voltage of the mains power feed. This means that, for example, during any short circuit in the mains supply feed unnecessary power consumption due to the short circuit can be avoided.

Figure 2:
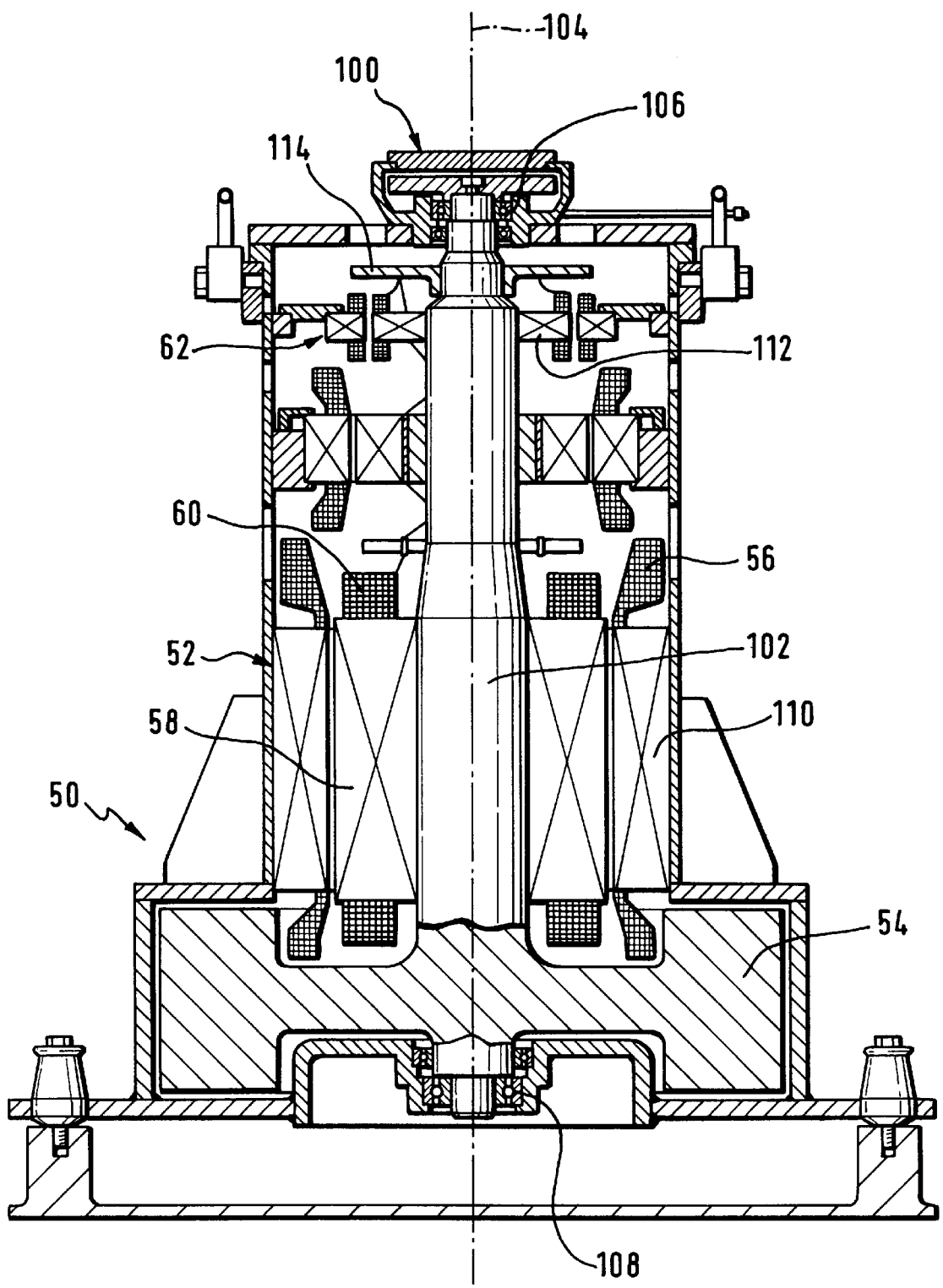
FIG. 2 shows a vertical section through a schematic illustration of a preferred embodiment of an inventive flywheel storage means.

As illustrated in FIG. 2, one advantageous embodiment of the inventive flywheel storage means 50 provides for the flywheel 54 itself to be arranged in a suspended manner, namely in a passive magnetic bearing which is designated as a whole as 100 and fixes a flywheel shaft 102, which is preferably connected to the flywheel 54 in one piece, in a suspended manner in the direction of its axis 104, wherein the flywheel shaft 102 is mounted, in addition, in radial bearings 106 adjacent to the magnetic bearing 100 and radial bearings 108 arranged at a lower end of the flywheel shaft 102, wherein the radial bearings 106 and 108 are preferably mechanical bearings which are merely subjected to small stresses.

The rotor 58 of the synchronous machine 52 is seated directly on the flywheel shaft between the magnetic bearing 100 and the flywheel 54 and is surrounded by a stator 110 of the synchronous machine 52, in which the three-phase winding 56 is arranged.

Furthermore, the exciting machine 62 is seated between the magnetic bearing 100 and the synchronous machine 52, wherein a rotor 112 thereof is likewise seated on the flywheel shaft 102 and connected to a co-rotating rectifier 114 which is likewise seated on the flywheel shaft 102 and supplies the direct current for the exciter winding 60 of the rotor 58.

In the case of the flywheel storage means 50 illustrated in FIG. 2, the flywheel 54 is seated close to a lower end of the flywheel shaft 102 which is mounted in the radial bearing 108. Furthermore, the flywheel 54 is mounted in a gas atmosphere reducing friction, preferably at underpressure.

Figure 3:
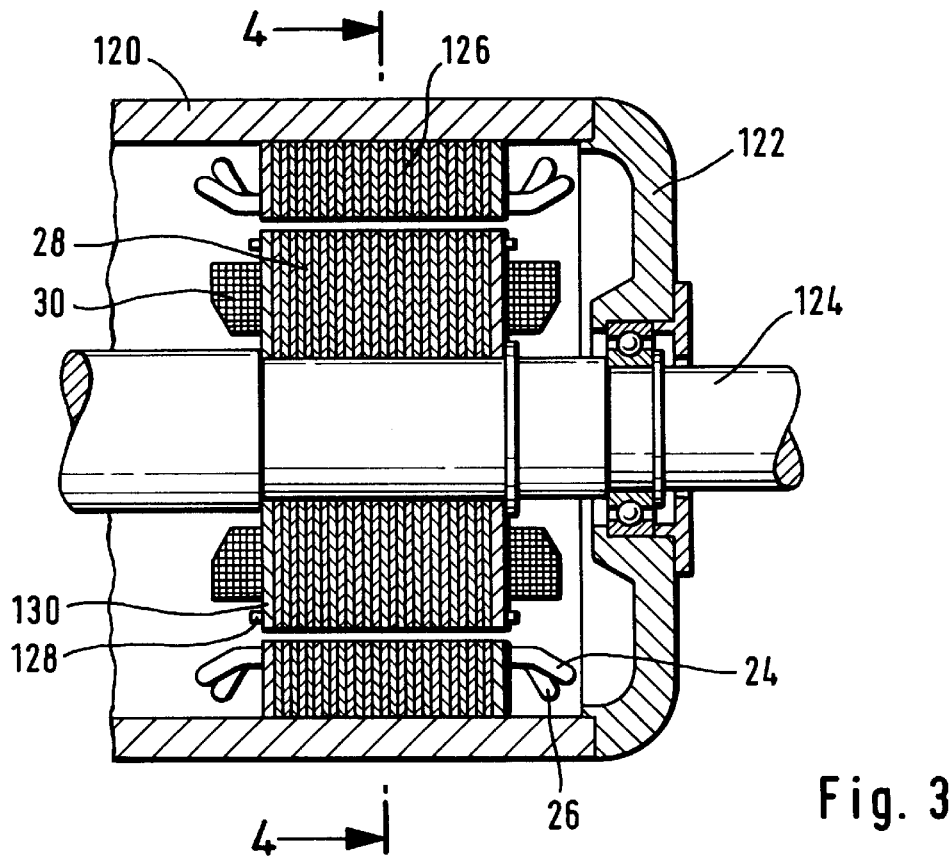
FIG. 3 shows a vertical, longitudinal section through a preferred embodiment of an inventive converter machine.
Figure 4:
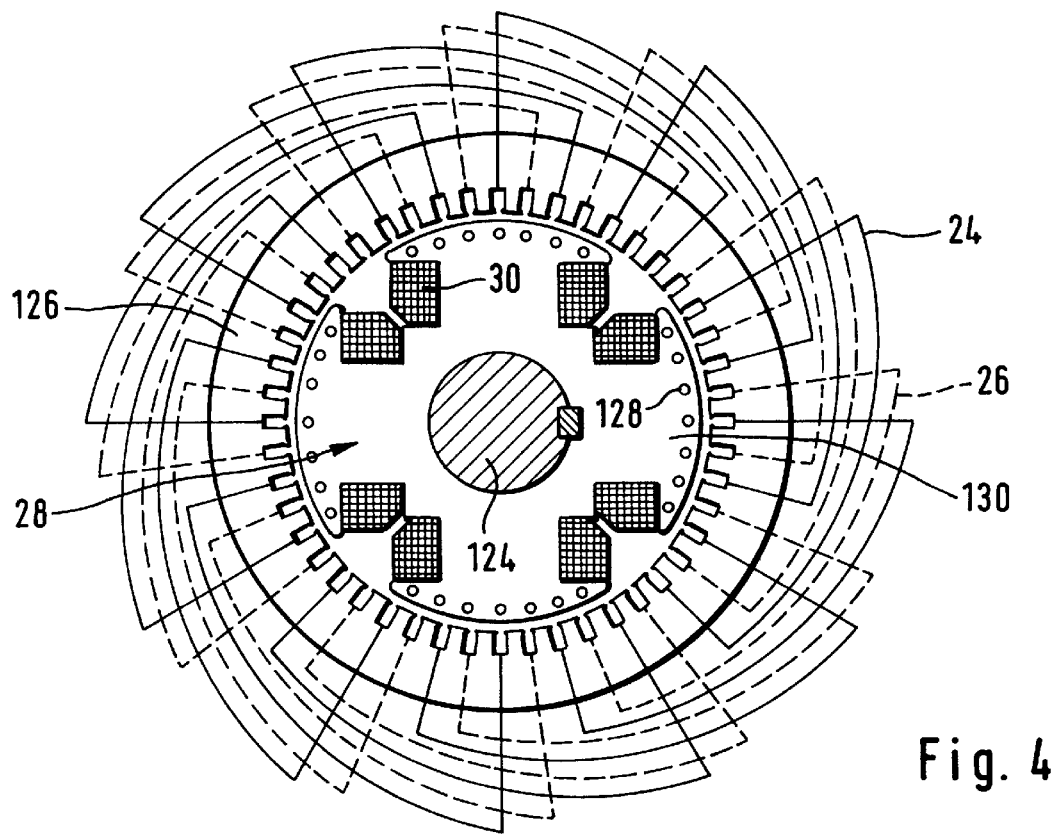
FIG. 4 shows a section along line 4-4 in FIG. 3 with illustration of the three-phase windings.

A preferred embodiment of an inventive converter machine, illustrated in FIGS. 3 and 4, comprises a housing 120 with bearing brackets 122, in which a shaft 124 is mounted for rotation. The shaft 124 bears the rotor 28 with the exciter winding 30.

Furthermore, a stator pack designated as a whole as 126 is arranged in the housing 120 and, as illustrated in FIG. 4, both the first three-phase winding 24 and the second three-phase winding 26 are wound into this stator pack, namely such that the first three-phase winding 24 and the second three-phase winding 26 are of an identical design and are located in the stator pack 126 so as to be respectively offset relative to one another by one slot spacing. The winding strands of the first three-phase winding 24 are illustrated in FIG. 4 with solid lines whereas the winding strands of the three-phase winding 26 are represented in FIG. 4 by dashed lines. The three-phase windings 24 and 26 are illustrated in FIG. 4 on a machine of a four-pole, three-phase design with a shortened winding pitch of ⅚ of the pole spacing and for reasons of simplicity in the shape of a single-layer winding.

Furthermore, the rotor 28 is also provided with attenuating windings in the form of attenuator rods 128 which are short-circuited in the region of front ends of the rotor 28 by means of short-circuit plates 130. As a result of these attenuator windings in the rotor 28, all the harmonic waves of the voltage present at the first three-phase winding 24 are effectively short-circuited and thus eliminated in the flux. It is thus possible to transfer only the basic frequency from the first three-phase winding 24 to the second three-phase winding 26.

The rotating magnetic field of the first three-phase winding 24 is entrained by the rotor 28, wherein, in the case of a converter machine designed as a synchronous machine, the entrainment of the rotor takes place synchronously. Furthermore, a conversion of the power supplied to the first three-phase winding 24 into mechanical energy does not take place in the case of the converter machine 22. On the contrary, a direct transformative transfer of the electrical energy takes place by way of flux linkage between the two three-phase windings 24 and 26.

The converter machine is preferably designed in accordance with the combined powers of the first and second three-phase windings 24 and 26, respectively, i.e. for double the power, for which motor and generator are respectively to be designed in the case of a known single-housing machine having the same power. This results in a substantial reduction in the power-weight ratio and, in addition, to an increase in efficiency.

When the converter machine 22 is designed as a synchronous machine, the first three-phase winding 24 supplies a constant, sinusoidal voltage which is independent of load variations in the power supply system 10 and remains unaffected by all procedures in the mains power feed 14, wherein the voltage regulator 36 sees to it that the magnetic flux of the converter machine is brought about via the direct current excitation of the rotor 28 such that the voltage in the first three-phase winding 24 remains essentially constant.

As for the rest, with respect to the description of additional features of an advantageous embodiment of the converter machine used reference is made in full to European patent application 0 071 852 which discloses further details of such a converter machine.

Figure 5:
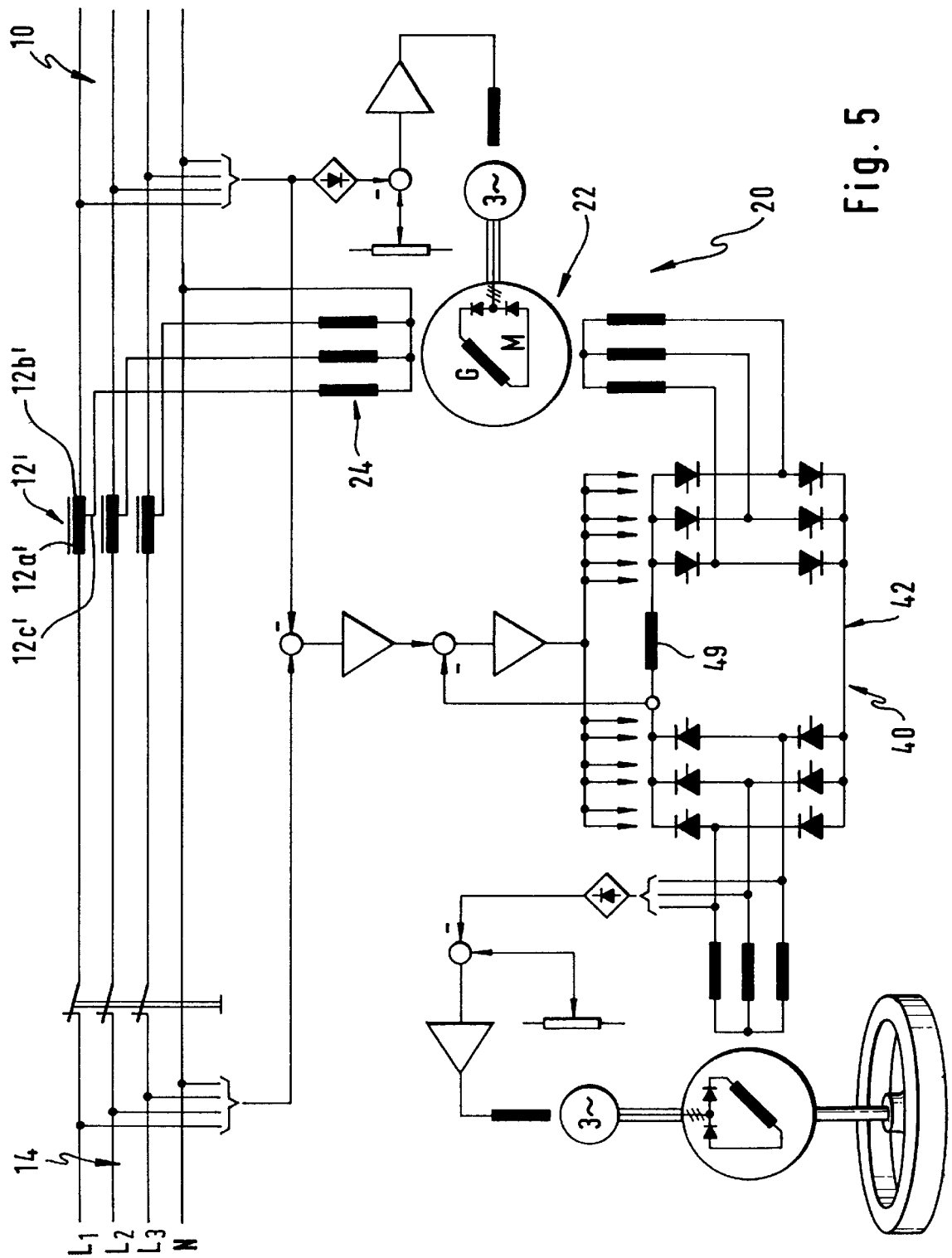
FIG. 5 shows a schematic illustration similar to FIG. 1 of a second embodiment.

In a second embodiment of the inventive system, illustrated in FIG. 5, those parts which are identical to those of the first embodiment are given the same reference numerals and so with respect to their description reference can be made in full to the description of the first embodiment.

In contrast to the first embodiment, the choke 12' in the second embodiment according to FIG. 5 is not designed as a simple choke but as a coupling choke with a first winding 12a' facing the mains power feed 14, a second winding 12b' facing the power supply system 10 and an intermediate tap 12c' which is connected to the first three-phase winding 24 of the converter machine 22 of the converter system 20. Such a coupling choke 12' has the advantage that, with it, short circuits in the mains power feed 14 can also be coped with by the converter system 20 and it is then possible to keep the voltage in the power supply system 10 essentially constant by means of the converter system 20, even in the case of such short circuits. This is advantageously possible, in particular, when the counterreactance between the windings 12a' and 12b' corresponds approximately to the subtransient reactance of the converter machine 22, and thus the counterreactance in the case of a short circuit in the mains power feed 14 compensates for any drop in voltage of the converter machine on account of its intrinsic resistance.

As for the rest, the second embodiment according to FIG. 5 is identical to the first embodiment and so, in this respect, reference can be made in full to the explanations concerning the first embodiment.

Figure 6:
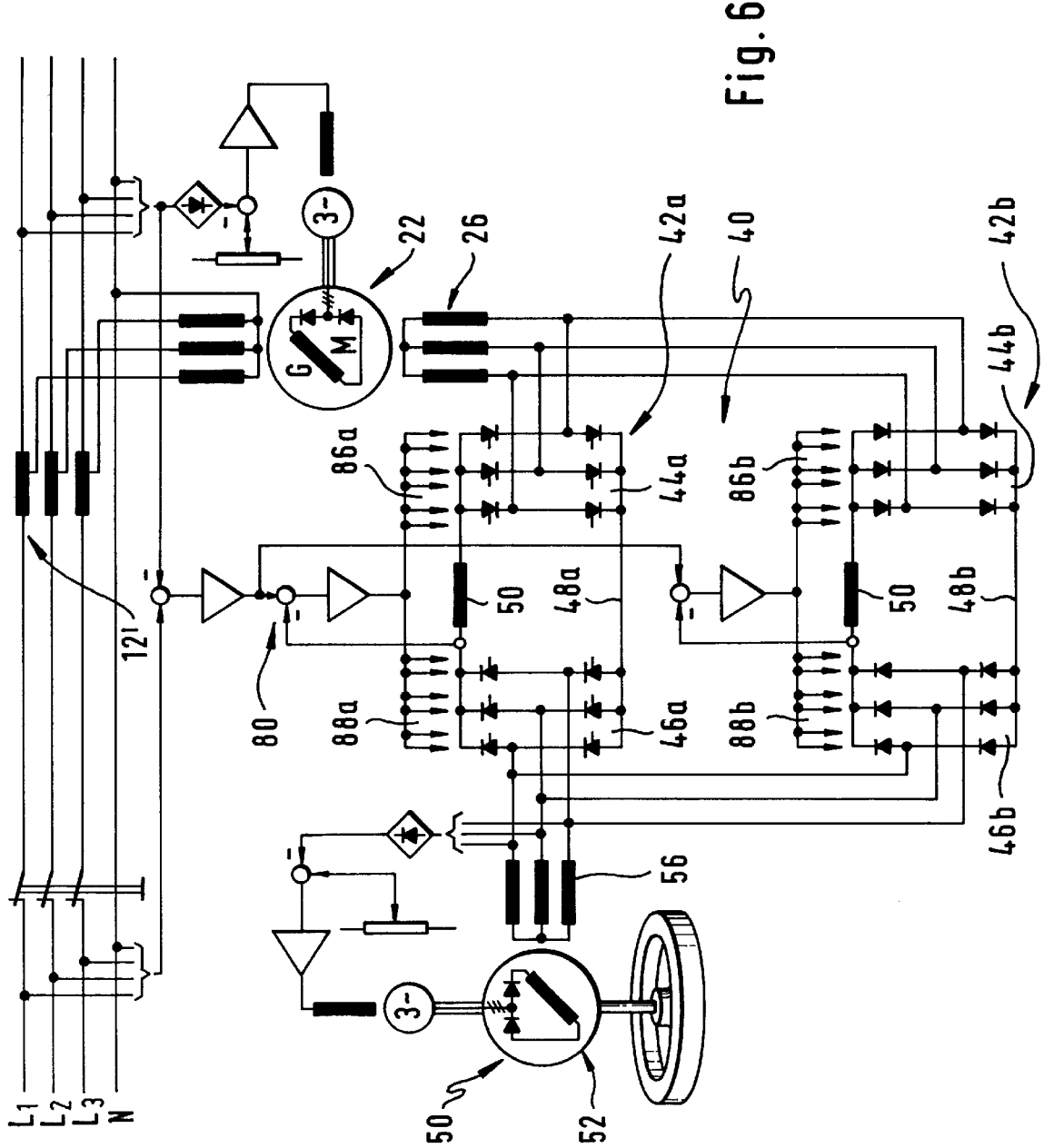
FIG. 6 shows a schematic illustration similar to FIG. 1 of a third embodiment.

In a third embodiment of the inventive system, illustrated in FIG. 6, those elements which are identical to those of the first embodiment and the second embodiment are likewise given the same reference numerals and so with respect to the description of these elements reference can be made to the explanations concerning the preceding embodiments. In contrast to the preceding embodiments, the static converter system 40 does, however, comprise two static converter circuits 42a and 42b arranged parallel to one another, wherein each of the static converter circuits has a static converter 44a, 44b which is connected to the second three-phase winding 26 and a static converter 46a, 46b which is connected to the three-phase winding 56 of the synchronous machine 52 of the flywheel storage means 50. Furthermore, the two static converters 44a, 46a and 44b, 46b are coupled to one another in both static converter circuits 42a and 42b via direct current links 48a and 48b, respectively.

The control 80 is designed such that it is in a position to control the trigger devices 86a, 88a and 86b, 88b in the two static converter circuits 42a, b.

The two static converter circuits 42a, 42b are preferably designed such that they are in a position to respectively connect approximately half the maximum possible effective power. For example, the static converter circuit 42a is primarily operated by the control 80 such that this can be used for coupling effective power from the converter machine to the flywheel storage means 50 whereas the static converter circuit 42b is primarily operated such that this can be used to couple effective power from the flywheel storage means 50 to the converter machine 22. This is adequate as long as half the maximum possible effective power at the most is to be connected each time between the converter machine 22 and the flywheel storage means 52. Up to this half the maximum effective power, the solution according to the third embodiment offers the advantage that the connecting times become quicker since no switching over of the static converters 44a, 46a or 44b, 46b is required but rather the two static converter circuits 42a and 42b are operated in respectively opposite directions by the control on account of their basic setting.

If, however, the maximum effective power is to be coupled from the flywheel storage means 50 to the converter machine 22 or vice versa, that static converter circuit 42a or 42b which operates in its basic setting in the opposite direction is switched over by the control 80 so that, in this case, the two static converter circuits 42a, 42b are operating in parallel.

The capability of the static converters 44a, b, 46a, b to be switched over has, in addition, the advantage that a redundant system is available up to half the effective power since, when one of the static converter circuits 42a, 42b breaks down, the other static converter circuit 42b, 42a can be used to transfer effective power in both directions by switching over the static converters between rectifier function and inverter function.

Figure 7:
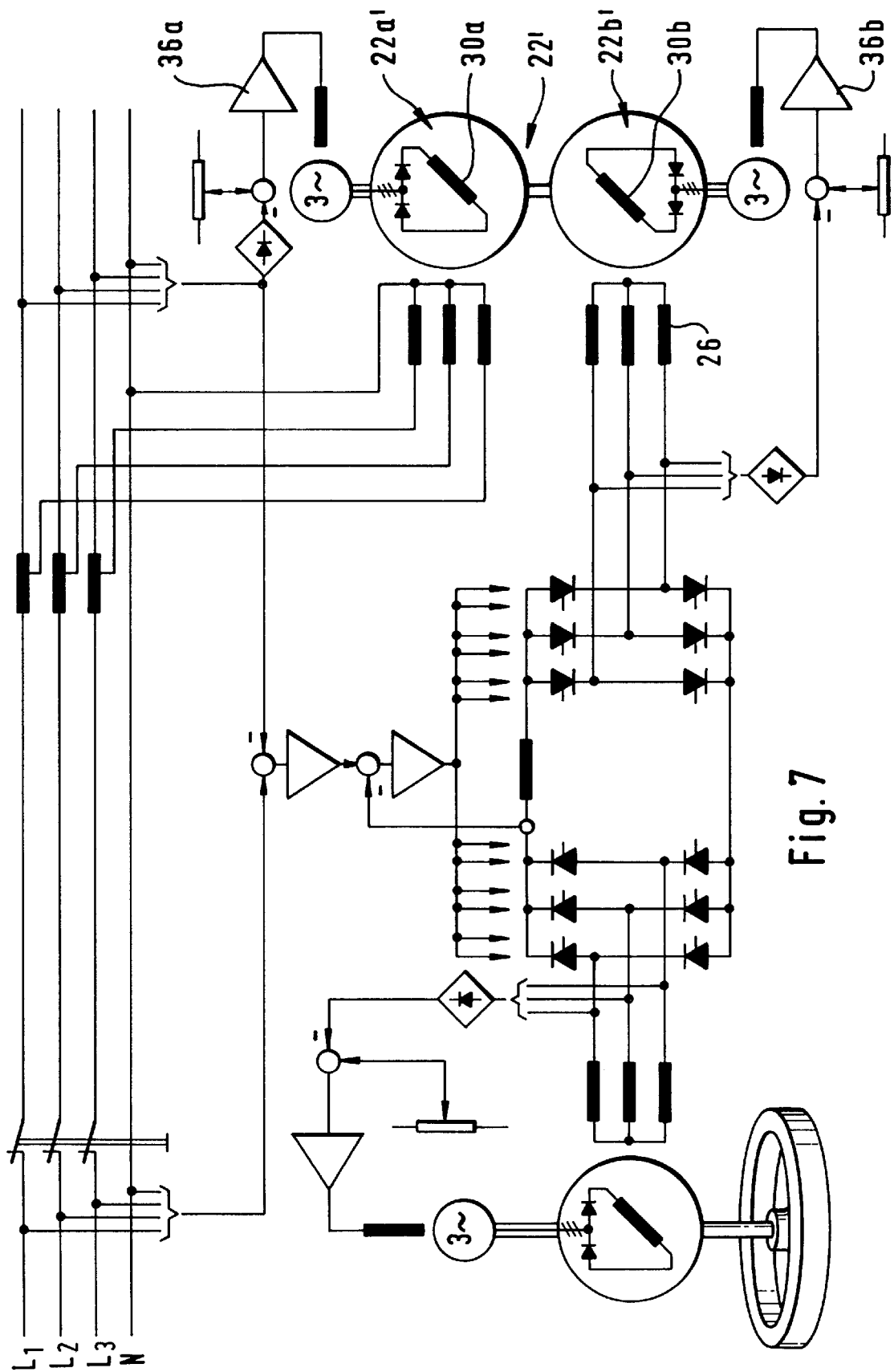
FIG. 7 shows a schematic illustration similar to FIG. 1 of a fourth embodiment and FIG. 8 shows a schematic illustration similar to FIG. 1 of a fifth embodiment.

In a fourth embodiment of an inventive system, illustrated in FIG. 7, the converter machine 22' is designed in the form of two separate synchronous machines 22a' and 22b', wherein each of these synchronous machines has an exciter winding 30a and 30b, respectively, and each exciter winding can be regulated via a voltage regulator 36a and 36b, respectively, provided for this purpose. In the case of the voltage regulator 36b, regulation takes place in accordance with the voltage occurring in the second three-phase winding 26.

Figure 8:
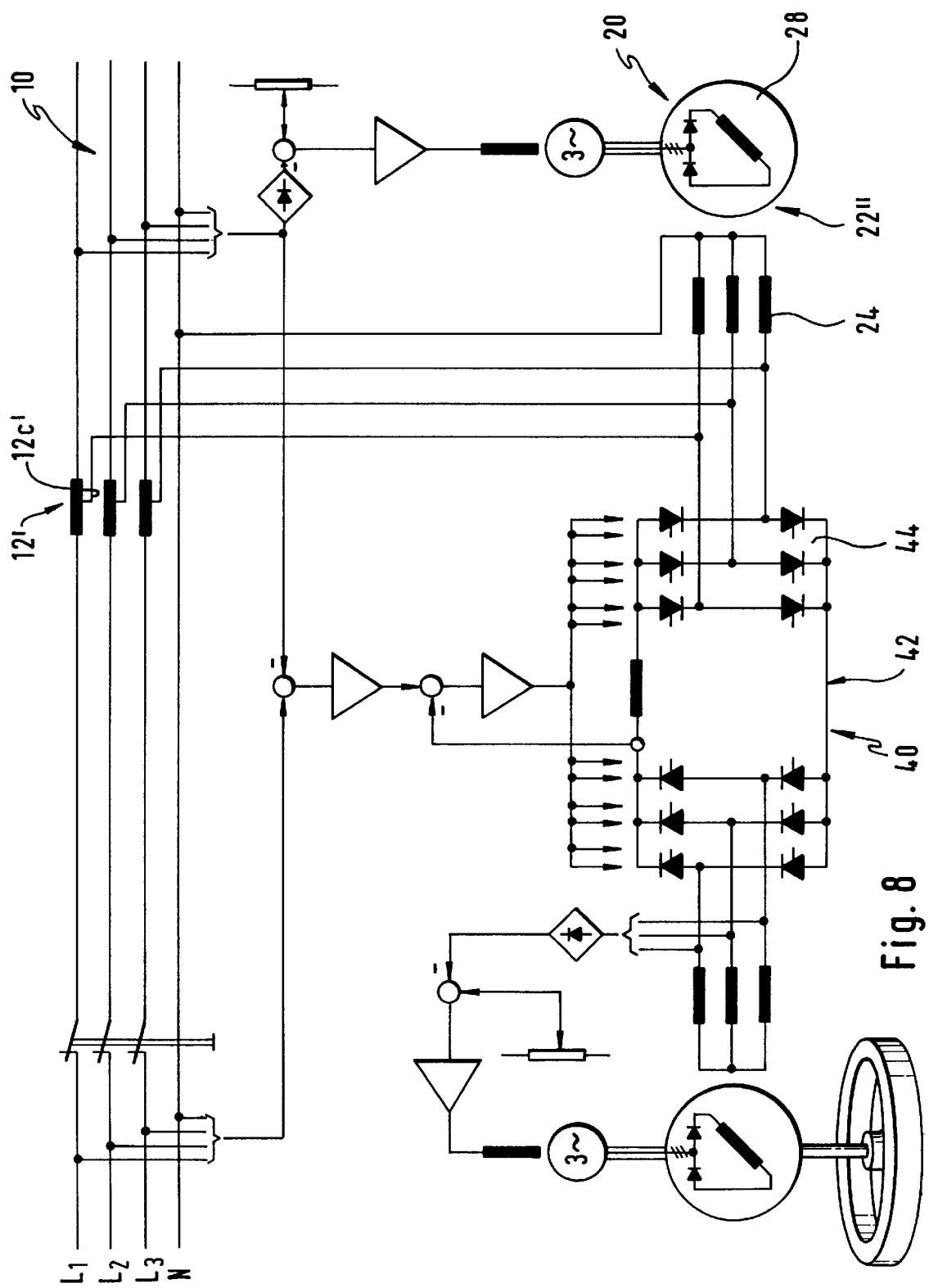

In a fifth embodiment, illustrated in FIG. 8, the converter machine 22" is designed in the form of a simplified machine and merely has the three-phase winding 24 which is connected not only to the intermediate tap 12c' of the coupling choke 12' but also to the static converter 44 of the static converter circuit 42 so that the second three-phase winding 26 can be omitted and, at the same time, is formed by the first three-phase winding 24.

The inventive system for stabilizing the voltage in the power supply system 10 can also be preferably used for the purpose of operating as an uninterruptible power supply. The flywheel storage means 50 is preferably dimensioned such that its energy is sufficient to maintain the voltage in the power supply system 10 during any failure in the mains power feed 14 for a period of time of up to 10 seconds. Since 97% of all customary mains failures in the mains power feed occur within periods of time which are shorter than 10 seconds, the energy in the flywheel storage means 50 is adequate for 97% of all failures in the mains power feed 14.

If the failure in the mains power feed lasts longer than 10 seconds, an additional control which serves to switch off the power supply system can be provided in one embodiment of the inventive system.

Alternatively thereto it is conceivable to couple the converter machine 22 to a diesel generating unit and in the case of any failure in the mains power feed 14 of more than 10 seconds to start the diesel generating unit which then drives the rotor 28 of the converter machine 22 in order to ensure the voltage in the power supply system 10 over a longer period of time. In this case, the energy stored in the flywheel storage means 50 serves the purpose of first bridging the period of time during such a failure of the mains power feed 14 until the diesel generating unit has reached full power.

As soon as the diesel generating unit has primarily taken over operation of the rotor 28, the static converter system 40 with the flywheel storage means 50 continues to serve in the manner already described above to stabilize the voltage in the power supply system, for example, during load jumps in the power supply system and thereby aid the diesel generating unit.

What is claimed is:

1. Apparatus for stabilizing the voltage of a power supply system having at least one load connected thereto, said apparatus including a choke unit for connecting said power supply system to a mains power system and a converter system for stabilizing the power supply system voltage, said converter system comprising:
    a converter machine having a rotor and at least one three phase winding, one three phase winding of said converter machine being coupled to said power supply system;
    a voltage controller adapted to detect said power supply system voltage and control said converter machine to maintain said voltage at a predetermined value;
    a flywheel storage unit including a synchronous machine and a flywheel coupled thereto;
    a static converter unit coupling the synchronous machine of said flywheel unit and one three phase winding of said converter machine to exchange real power between the flywheel unit and converter machine by changing the speed of said flywheel; and
    a converter controller, responsive to at least one electric parameter of said power supply system and of said mains power system, to control said static converter unit such that the flywheel storage unit supports said converter machine in stabilizing the power supply system voltage by drawing real power from the converter machine or supplying real power to the converter machine.

2. Apparatus as defined in claim 1, wherein the static converter unit comprises at least one static converter circuit with two static converters coupled via a direct current link.

3. Apparatus as defined in claim 2, wherein each of the static converters is adapted to be switched between a rectifier function and an inverter function.

4. Apparatus as defined in claim 2, wherein the static converters are controllable by the converter controller such that in one static converter circuit one of the static converters operates in a rectifier function and the other in an inverter function.

5. Apparatus as defined in claim 2, wherein the static converter unit comprises several static converter circuits connected in parallel.

6. Apparatus as defined in claim 5, wherein the converter controller controls said static converters of one static converter circuit for supplying power to the converter machine or drawing power from the converter machine.

7. Apparatus as defined in claim 2, wherein a choke is arranged in the direct current link of each static converter circuit.

8. Apparatus as defined in claim 1, wherein:
    the choke between the mains power system and the power supply system comprises a coupling choke; and
    the converter machine is connected to an intermediate tap of the coupling choke.

9. Apparatus as defined in claim 8, wherein a counterreactance of the coupling choke corresponds approximately to a subtransient reactance of the converter machine.

10. Apparatus as defined in claim 1, wherein a voltage generated by the converter machine is adapted to be controlled via an exciter winding of the rotor.

11. Apparatus as defined in claim 10, wherein the exciter winding is adapted to be excited in a brushless manner.

12. Apparatus as defined in claim 1, wherein excitation of the converter machine is controlled in accordance with the power supply system voltage.

13. Apparatus as defined in claim 1, wherein the converter machine has a single three-phase winding connected to the power supply system and to the static converter unit.

14. Apparatus as defined in claim 1, wherein the converter machine has a first three phase winding connected to said power supply system and a second three-phase winding connected to said static converter unit.

15. Apparatus as defined in claim 14, wherein the first three-phase winding and the second three-phase winding have the same number of poles.

16. Apparatus as defined in claim 14, wherein the first three-phase winding and the second three-phase winding are arranged in a common pack.

17. Apparatus as defined in claim 16, wherein the first three-phase winding and the second three-phase winding are arranged in separate slots.

18. Apparatus as defined in claim 1, wherein the rotor has an attenuator winding.

19. Apparatus as defined in claim 1, wherein said flywheel rotates about a vertical axis.

20. Apparatus as defined in claim 19, wherein the flywheel is suspended in a bearing.

21. Apparatus as defined in claim 20, wherein said bearing comprises a magnetic bearing.

22. Apparatus as defined in claim 1, wherein a rotor of the synchronous machine of the flywheel unit is seated on a shaft of the flywheel.

23. Apparatus as defined in claim 22, wherein the flywheel is arranged on a side of the rotor located opposite the magnetic bearing.

24. Apparatus as defined in claim 1, wherein an exciting machine is associated with the synchronous machine of the flywheel unit.

25. Apparatus as defined in claim 1, wherein the converter system supplies the entire power consumed in the power supply system during any failure of the mains power feed to said power supply system.

* * * * *